No. 857,308. PATENTED JUNE 18, 1907.
C. L. SANFORD.
ROLLING PIN.
APPLICATION FILED MAR. 27, 1907.
2 SHEETS—SHEET 1.
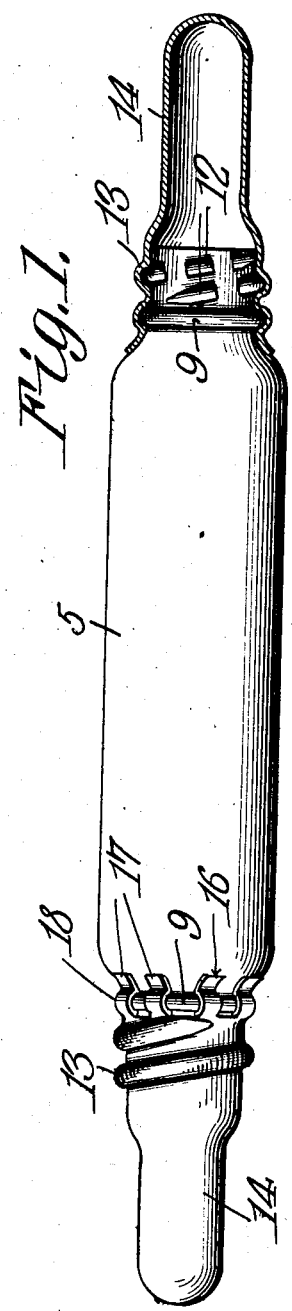
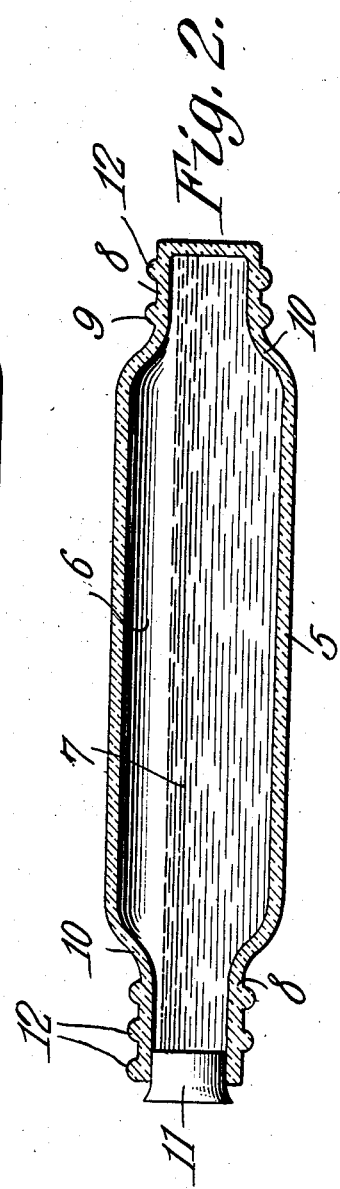
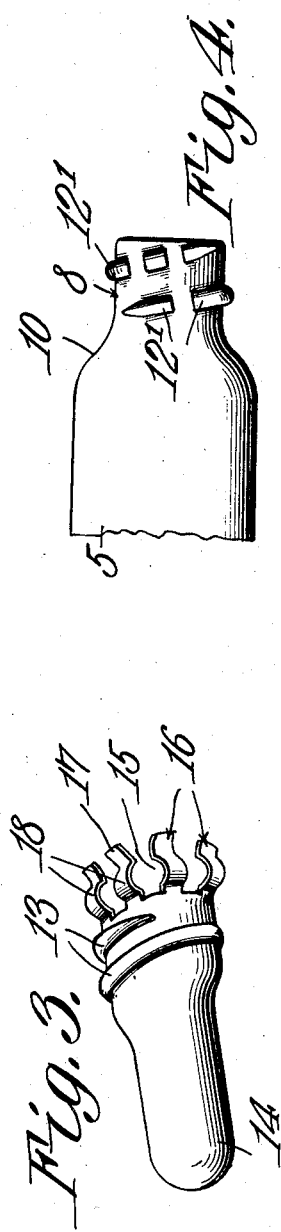
Charles L. Sanford,
INVENTOR.
By C. A. Snow & Co.
ATTORNEYS
WITNESSES:

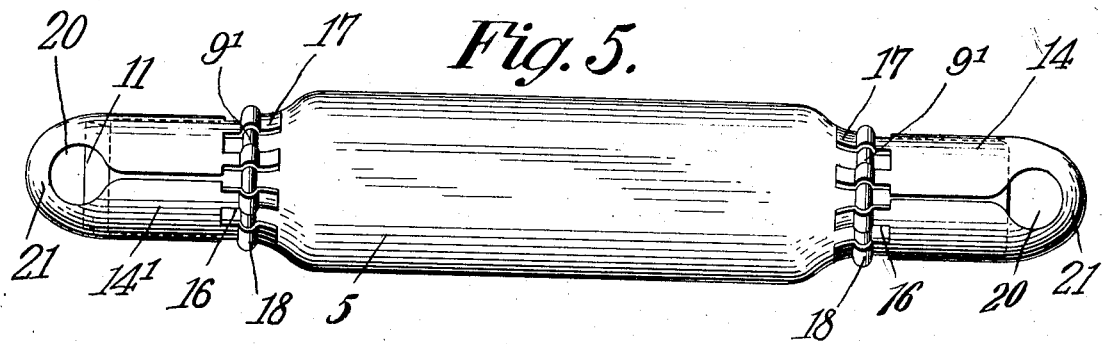
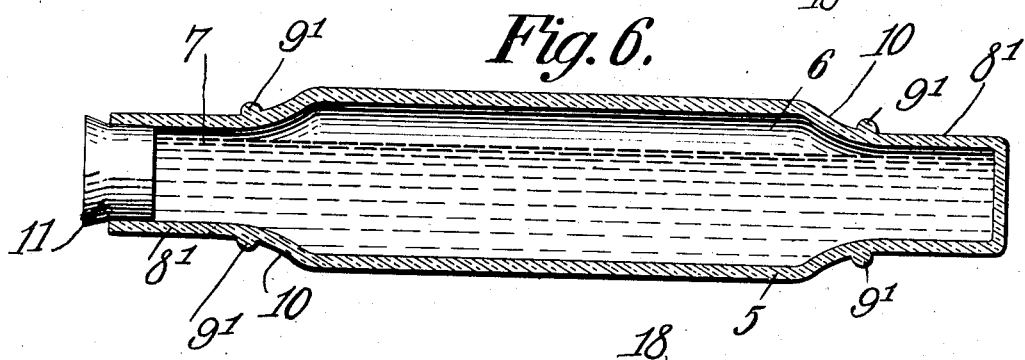
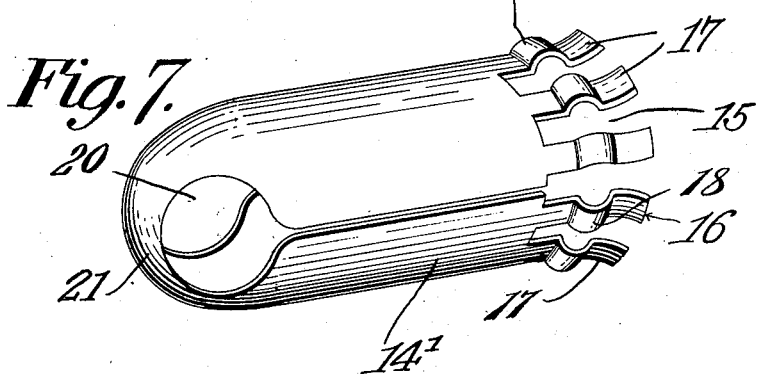
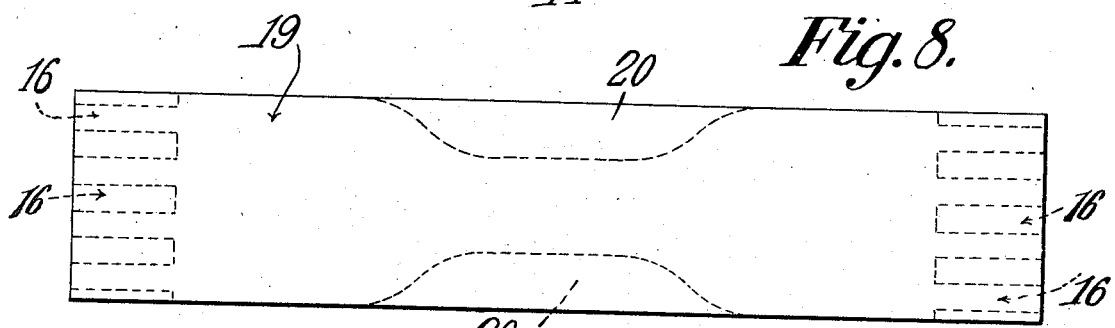

UNITED STATES PATENT OFFICE.

CHARLES L. SANFORD, OF WASHINGTON, PENNSYLVANIA, ASSIGNOR OF ONE-FOURTH TO OKEY J. MORRISON, OF RIPLEY, WEST VIRGINIA.

ROLLING-PIN.

No. 857,308.  Specification of Letters Patent.  Patented June 18, 1907.

Application filed March 27, 1907. Serial No. 364,928

To all whom it may concern:

Be it known that I, CHARLES L. SANFORD, a citizen of the United States, residing at Washington, in the county of Washington and State of Pennsylvania, have invented a new and useful Rolling-Pin, of which the following is a specification.

This invention relates to rolling pins of that general class employed by bakers and other persons for rolling dough and other pastry preparatory to baking the same.

The object of the invention is to provide a rolling pin having a compartment or chamber for the reception of a cooling medium thereby to maintain the dough or pastry at a sufficiently low temperature to prevent the same from becoming tough when the latter is placed in an oven and baked.

A further object of the invention is provide a rolling pin having a pair of handles threaded on the opposite ends thereof and provided with smooth unobstructed bearing surfaces whereby the pin may be conveniently manipulated without undue friction between the hands of the operator and the terminal handles of said pin.

A still further object of the invention is to generally improve this class of devices so as to increase their utility, durability and efficiency as well as to reduce the cost of manufacture.

With these and other objects in view the invention consists in the construction and novel combination and arrangement of parts hereinafter fully described, and illustrated in the accompanying drawings, it being understood that various changes in form, proportions and minor details of construction may be resorted to within the scope of the appended claims.

In the accompanying drawings forming a part of this specification: Figure 1 is a side elevation partly in section of a rolling pin constructed in accordance with my invention. Fig. 2 is a longitudinal sectional view of the same with the supporting handles detached. Fig. 3 is a perspective view of one of the supporting handles detached. Fig. 4 is a side elevation of a portion of a rolling pin illustrating a modified form of the invention. Fig. 5 is a side elevation illustrating a further modification. Fig. 6 is a longitudinal sectional view of the rolling pin shown in Fig. 5 with the handles detached. Fig. 7 is a perspective view of one of the handles shown in Fig. 5 detached. Fig. 8 is a plan view of the blank from which the handles shown in Fig. 5 are formed.

Similar numerals of reference indicate corresponding parts in all of the figures of the drawings.

The improved device consists of a cylindrical body portion 5 preferably formed of glass or other suitable material and provided with an interior compartment or chamber 6 for the reception of a quantity of ice, ice-water or other cooling medium, indicated at 7. The opposite ends of the body portion 5 are reduced at 8 and provided with annular flanges or beads 9 and inclined shoulders 10. One end of the chamber 6 is closed while the opposite end thereof opens through the adjacent end of the rolling pin and is normally closed by a suitable stopper or plug 11 which serves to prevent the escape of water or other cooling medium within said compartment.

The exterior walls of the reduced portions or necks 8 are molded or otherwise formed with interrupted threads 12 for engagement with corresponding grooves or depressions 13 formed in the walls of the operating handles 14.

The handles 14 are preferably stamped or otherwise formed from a single piece of metal and are each provided with a plurality of spaced notches or recesses 15 defining a series of longitudinally disposed spring tongues 16 adapted to yieldably engage the opposite ends of the pin, as shown.

The terminals of the tongue 16 are bent laterally, as indicated at 17 for engagement with the inclined shoulders 10 while the intermediate portion of said tongues are formed with annular grooves or depressions 18 for the reception of the flange or bead 9, thereby to assist in preventing accidental rotation of said handles on the necks 8 when rolling the dough, pastry or other material.

Attention is called to the fact that the handle adjacent the open end of the cylindrical body portion 5 forms a closure for the stopper or plug 11 and thus serves to prevent accidental displacement of said plug during the rolling operation. The closed ends of the handles are preferably reduced and provided with smooth unobstructed bearing surfaces for engagement with the hand thereby permitting free manipulation of the pin without undue friction between the hands of the operator and the reduced ends of said handles.

In using the device the chamber 6 is first filled with ice-water or other cooling medium and the stopper 11 placed in position in the open end of said pin after which the handles a' threaded on the reduced extensions or necks 8 and adjusted longitudinally of said necks until the grooves 18 engage the flanges or beads 9 and the deflected ends of the tongues 17 bear against the inclined shoulders 10 thus securely locking the handles in position on the pin and effectually preventing accidental displacement of the same. In order to refill the reservoir or chamber 6 it is merely necessary to remove one of the handles when the plug may be quickly detached and the liquid or other cooling medium introduced through the open end of the pin, as will be readily understood.

In Fig. 4 of the drawings there is illustrated a modified form of the invention in which the annular flange or bead 9 is dispensed with, the peripheral threads 12' of the reduced necks being relied upon to retain the operating handles in position on the body portion.

A further modification is illustrated in Figs. 5 to 8 inclusive. In this form of the device the exterior walls of the necks 8', between the annular flanges or beads 9' and the adjacent ends of the body portion are smooth and devoid of threads and adapted to bear against the correspondingly smooth interior walls of the operating handle 14'.

The operating handles shown in Fig. 5 of the drawings are each preferably formed of a sheet metal blank 19 the longitudinal edges of which are cut away at 20 and the opposite ends thereof bent laterally to form a pair of spring arms adapted to engage the exterior walls of the neck, said spring arms being connected by an intermediate web 21 by means of which the rolling pin may be conveniently hung on a nail or other suitable support when the pin is not in use.

While the device is preferably constructed of glass it is obvious that the same may be formed of metal, terra cotta, porcelain or other suitable material and that the pins may be made in various sizes and shapes according to the use for which they are designed.

From the foregoing description it will be seen that there is provided an extremely simple, inexpensive and efficient device, admirably adapted for the attainment of the ends in view.

Having thus described the invention what is claimed is:

1. A rolling pin including a hollow body portion having an interior chamber opening through one end of the pin and adapted to contain a cooling medium, a circumferential flange formed on each end of the body portion a closure for the open end of said pin, and handles detachably secured to the opposite ends of the pin, and provided with terminal spring fingers adapted to engage the adjacent flanges on said body portion one of said handles forming a housing for the closure.

2. A rolling pin including a hollow body portion having an interior chamber for the reception of a cooling medium and provided with oppositely disposed flanges the side walls of the body portion at the opposite ends thereof being beveled to form inclined shoulders, and handles secured to the opposite ends of the pin and provided with spaced spring clamping fingers adapted to engage the flanges and shoulders, respectively.

3. A rolling pin including a hollow body portion having its opposite ends reduced to form terminal necks, the exterior walls of which are provided with interrupted threads, there being an annular flange formed on each neck at a point adjacent the threads, and handles engaging the threads on the necks and provided with terminal spring fingers for engagement with the annular flanges.

4. A rolling pin having an interior chamber for the reception of a cooling medium and provided with oppositely disposed necks the exterior walls of which are formed with annular flanges, and handles detachably mounted on the necks and provided with terminal spring fingers for engagement with the flanges, one end of each handle being reduced and provided with smooth exterior walls forming bearing surfaces.

5. A rolling pin having an interior chamber for the reception of a cooling medium and having its opposite ends reduced and provided with annular flanges, the walls of the pin at said flanges being beveled to form inclined shoulders, and handles detachably secured to the opposite ends of the pin and provided with spring clamping fingers having grooves formed therein for the reception of the flanges and having their terminals bent laterally for engagement with the inclined shoulders of the pin.

In testimony that I claim the foregoing as my own, I have hereto affixed my signature in the presence of two witnesses.

CHARLES L. SANFORD.

Witnesses:
  LEVI DAGUE,
  MARY E. SANFORD.